United States Patent [19]

Ballance

[11] Patent Number: 4,651,330
[45] Date of Patent: Mar. 17, 1987

[54] MULTIPOINT DATA COMMUNICATIONS

[75] Inventor: John W. Ballance, Ipswich, England

[73] Assignee: British Telecommunications public limited company, Great Britain

[21] Appl. No.: 667,918

[22] Filed: Sep. 5, 1984

[30] Foreign Application Priority Data

Oct. 14, 1983 [GB] United Kingdom ................. 8327587

[51] Int. Cl.$^4$ .............................................. H04L 7/00
[52] U.S. Cl. .................................... 375/108; 375/107; 375/109; 455/8; 455/51
[58] Field of Search ........................ 375/107, 108, 109; 455/51, 75, 71, 9, 10, 8; 370/103

[56]  References Cited

U.S. PATENT DOCUMENTS 2,782,314  2/1957  Miller ........................................ 455/8
4,251,801  2/1981  Le Mair .
4,308,505  12/1981  Messerschmitt .
4,308,613  12/1981  Chasek .
4,369,515  1/1983  Valdes ................................ 375/108

Primary Examiner—Robert L. Griffin
Assistant Examiner—M. Huseman
Attorney, Agent, or Firm—Nixon & Vanderhye

[57]  ABSTRACT

The node of a point to multipoint data telecommunications system needs a receive clock to regenerate the data. The conventional method of regenerating the clock from received signals is difficult because there are gaps when no outstation is active. The invention reduces these problems by synchronizing the receive clock with the master send clock when there is no reception.

8 Claims, 2 Drawing Figures

MULTIPOINT DATA COMMUNICATIONS

FIELD OF THE INVENTION

This invention relates to a data communications system in which a single node sends data to a plurality of outstations and receives data from said outstations.

BACKGROUND OF THE INVENTION

The communications system normally uses two channels, eg radio channels of two distinct frequencies. One channel is used by the node to send to all the outstations and the second channel is shared by all the outstations to send to the node. The system operates on a time sharing basis. Typical systems can provide service for 2 to 2000 outstations, eg 40 to 1000 outstations, using a frame period of 20 $\mu$s to 200 ms, e.g., 100 $\mu$s to 10 ms although not all outstations may have simultaneous access. Burst lengths (or slot lengths) are usually 1 $\mu$s to 1 ms, preferably 10 $\mu$s to 200 $\mu$s.

The system requires clocks for timing the data. A transmitter utilizes a clock to control the rate of transmission; at the receiving end the receiver utilizes a clock to assist in data regeneration and it is important that the clocks be suitably synchronized. However, the system as a whole is scattered over substantial distances, e.g., a close outstation might be only 2 km from the node whereas a distant outstation might be 30 km from the node. Thus the transit (go and return) time for signals can range from 9 $\mu$s to 90 $\mu$s. Substantial difficulties result from this substantial variation in time of transit.

SUMMARY OF THE INVENTION

This invention is concerned with the provision of a receive clock at the node. The outstations take it in turns to transmit and at the end of each turn the receive clock at the node has to acquire a new synchronization. Useful data transfer cannot occur until satisfactory synchronization has been achieved. The time spent waiting for synchronization constitutes time which cannot be used to transmit data and it is, therefore, desirable to keep this wasted time as short as possible. Thus, rapid synchronization is desirable.

According to this invention the node includes a master clock for controlling the rate of data transmission; a receive clock for controlling data recovery; and synchronization means synchronizing the receive-clock with received signals characterized in that the node includes means for feeding the output of the master clock to the synchronisation means in the absence of received signal.

BRIEF DESCRIPTION OF THE DRAWINGS

The invention will now be described by way of example with reference to the accompanying drawings in which.

DETAILED DESCRIPTION

Figure 1:
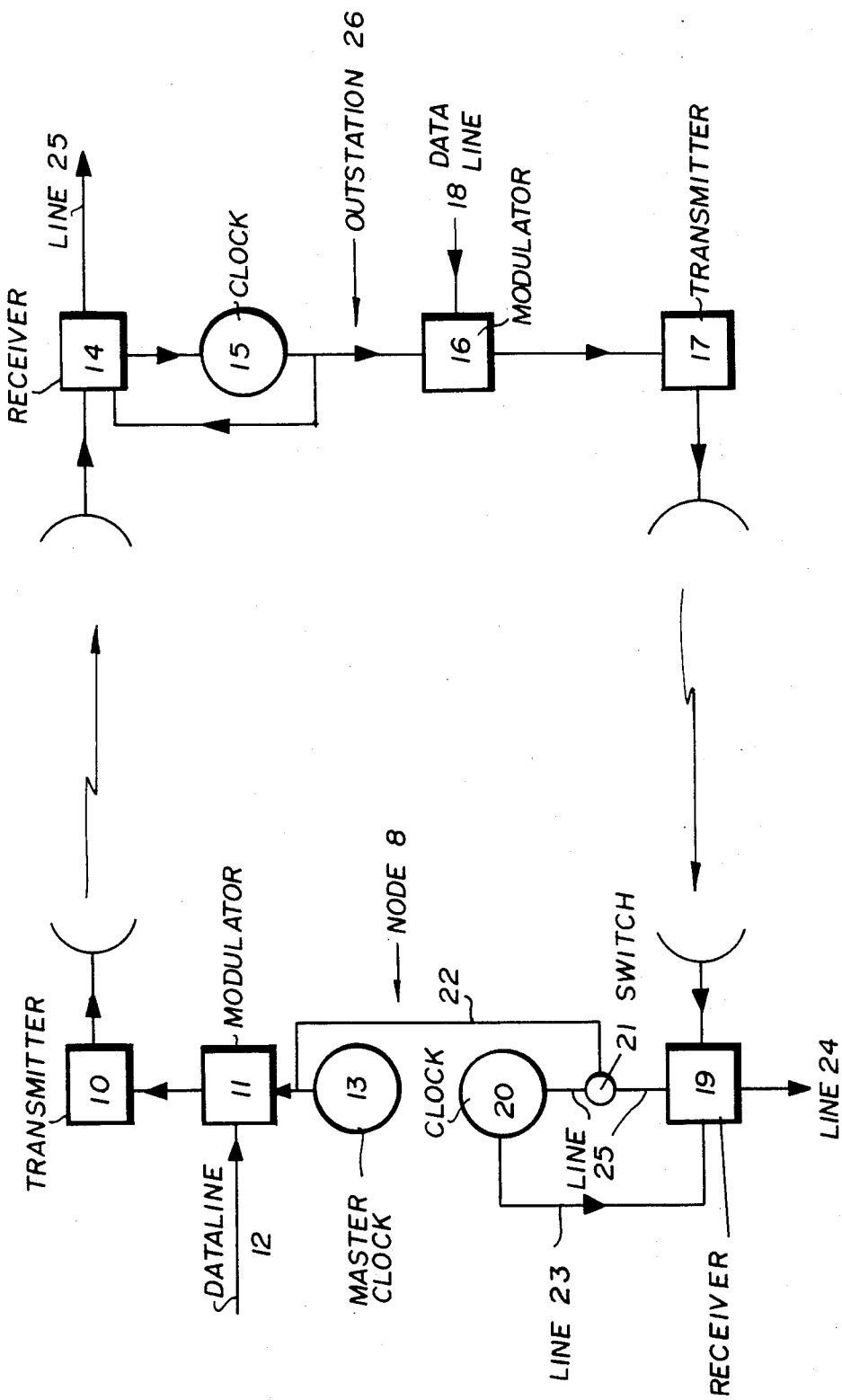
FIG. 1 is a block diagram showing the system as a whole.

FIG. 1 illustrates a node 8 (which includes synchronization according to the invention) in communication with an outstation. A commercial system would have many outstations but, since all have the same function, it is sufficient to illustrate one.

The node has a transmitter 10 which includes modulator 11. The modulator 11 receives data on line 12 and converts this data into a signal for transmission under control of master clock 13.

The signal is picked up by receiver 14 at an outstation and outstation clock 15 is synchronized with the signal using a conventional phase/frequency lock loop. The timing signals produced by the clock 15 are fed back to receiver 14 which uses the timing signals to regenerate data which is output on line 25. This is a conventional arrangement and the system is organized so that transmitter 10 and receiver 14 operate continuously in order to keep clock 15 in permanent adjustment. The data on line 12 may not be continuous and, in order to avoid a break, a pseudo random sequence is employed whenever there is no real data. The clock 15 operates all the time and there is no need to wait for clock 15 to acquire synchronisation when a (real) signal arrives after a period of pseudo-random sequence. As already indicated this method of operation is conventional.

The outstation also includes a transmitter 17 for communication with the node. Data for transmission is received by modulator 16 on line 18 and converted into a signal for transmission to the node under control of clock 15.

The node receives the signal, utilizing receiver 19, and the signal is passed via switch 21 to node receive clock 20 which is synchronised with the incoming signal. The timing signals produced by clock 20 are fed back to receiver 19 via line 23 and used to regenerate data on line 24. There is a similarity between the arrangement at the node, ie clock 20 and receiver 19, and the arrangement at each outstation, ie clock 15 and receiver 14, but there is an important difference in the operating conditions. Clock 15 is a slave following master clock 13 and, as explained above, the system provides continuous time information so that the slave can always follow its master. As there will be many outstations, e.g., 200, there will be many slave clocks but they all follow the same master clock 13.

The node receive clock 20 is also a slave which follows outstation clock 15 as master. However, clock 20 has many masters, e.g., 200, and not only do these masters take it in turns to take control but there are gaps when no master is active. It will be apparent that the well established and conventional use of phase/frequency lock loops, e.g., as used at the outstations, is not applicable at the node.

FIG. 1 also shows the arrangement according to the invention by which it is made possible to utilise a conventional phase/frequency lock loop. According to the invention line 25, providing input to the node receive clock 20, contains a switch 21 which is controlled by the squelch circuit of receiver 19. Switch 21, which is connected by line 22 to the output of master clock 13, has two configurations. In its primary configuration, adopted when the squelch circuit indicates that receiver 19 is receiving a signal, the signal passes to clock 20. In its alternative configuration, adopted when the squelch circuit indicates that receiver 19 is receiving no signal, the timing sequence from clock 13 passes to the clock 20.

The operation of the system will now be described.

Master clock 13 controls all the transmissions from the node and transmitter 10 continuously sends clock information to all outstations. Each outstation uses this information to sychronize a clock 15 to master clock 13 but this synchronization includes the transmission delay from transmitter 10 to receiver 14. In order to achieve bit-rates of 6.4M bits/sec, the data clocks should have a period of about 150 ns and in this time a signal, e.g., a radio signal, will travel only about 2 meters. The location of outstations is arbitrary to an accuracy of 2 meters. Therefore clock 15 is synchronized to clock 13 but many periods behind. Nevertheless the frequency lock will be accurate even though the phase relationship is arbitrary.

Outstation clock 15 controls the data rate from transmitter 17 and, during the transmission, a node receive clock 20 locks onto clock 15 with due allowance for transmission delay. Since clock 15 is synchronized to master clock 13, the overall effect is that node receive clock 20 is indirectly synchronised to master clock 13 with due allowance for double transmission delay. The outstations transmit in turn but it is necessary to leave gaps in order to avoid overlap and large gaps will occur when the outstations have no traffic. During these gaps node receive clock 20 is directly synchronized to master clock 13.

Because switch 21 inverts rapidly, the node receive clock 20 receives a continuous control signal and it is always synchronized with master clock 13. This synchronization may be direct, i.e., during gaps, or indirect via an outstation clock 15. The frequency remains constant throughout but there are frequent, sudden and sometimes large changes of phase as transmission delays alter. In these circumstances we have found that conventional phase/frequency lock loops can acquire phase lock very rapidly. More specifically we have found that phase lock can be acquired within 10 to 15 bits and, therefore, synchronization signals of 24 bit length (ie 3 bytes of 8 bits each) are sufficient. In the absence of the inventive feature, i.e., direct control of node receive clock 20 by master clock 13 via switch 21, a conventional loop would require too long to acquire synchronization. Clock 20 should have rapid control parameters, eg a band width of about 300 KHz and a response rate of 3 $MHzV^{-1}$ for a system operating at a data rate of 8M bit/sec.

(The clock 15 at the outstations do not have to make rapid adjustments and a slower response rate, e.g., 1/1000 of the response rate at the node, is more appropriate.)

Figure 2:
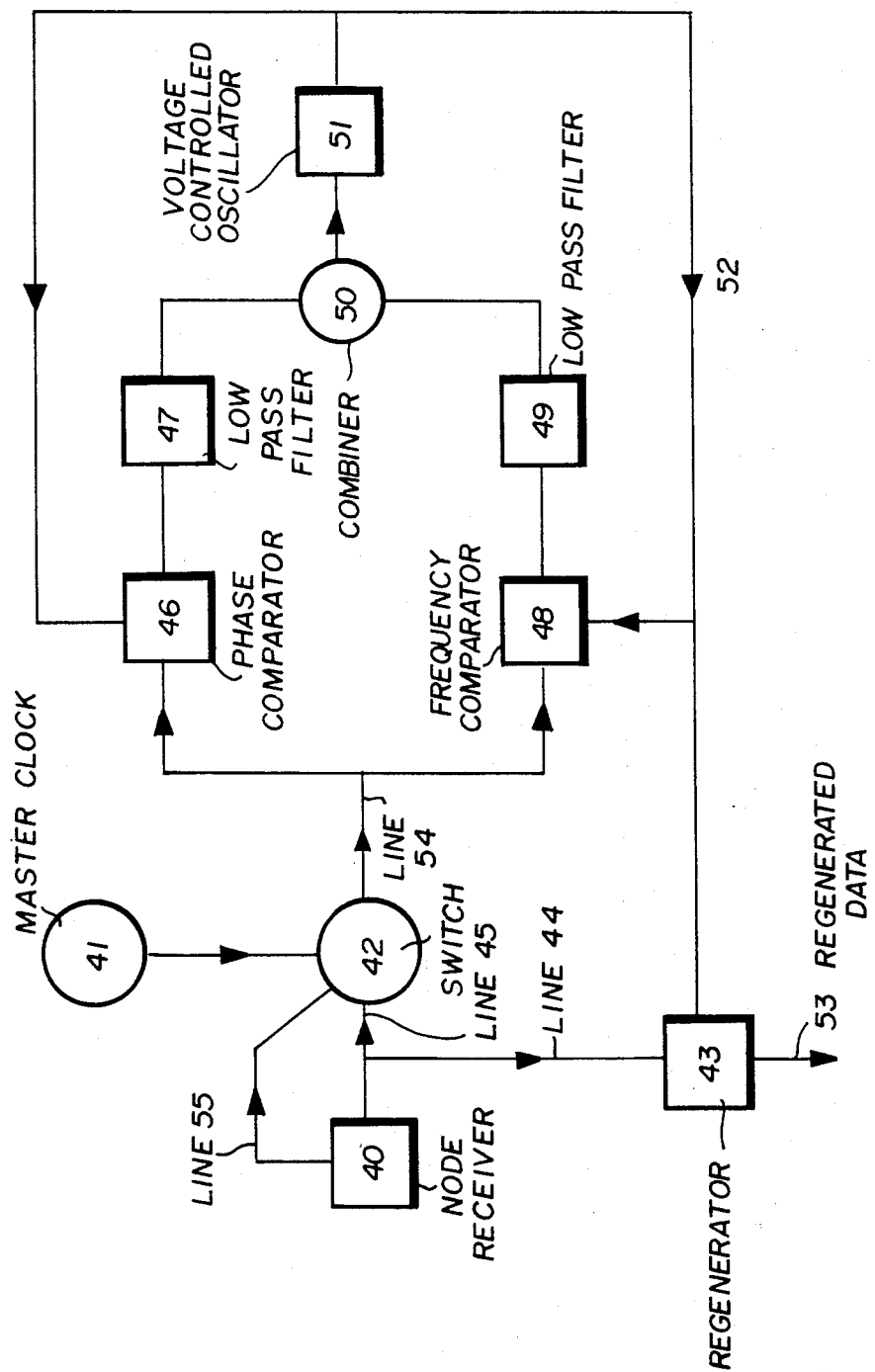
FIG. 2 is a block diagram of preferred arrangement at the node.

A more detailed diagram of the node receive clock and associated synchronization circuits is given in FIG. 2.

The node receiver 40 is connected to switch 42 via line 45 and to regenerator 43 via line 44. The squelch of receiver 40 is connected, via line 55, as the control to switch 42. As an alternative input master clock 41 is connected to switch 42.

The output from switch 42 bifurcates to phase comparator 46 (with low pass filter 47 in the output) and frequency (ie rate of change of phase) comparator 48 with low pass filter 49 in the output. The two outputs are combined in combiner 50 to generate a single control signal passing to voltage controlled oscillator 51. The output of voltage controlled oscillator 51 passes to regenerator 43 via line 52 and regenerated data is available on line 53. In addition the output of voltage controlled oscillator 51 is fed back to phase comparator 46 and frequency comparator 48. It is emphasized that items 46 and 48 are comparators, that is they compare the output of VCO 51 with the input from switch 42 and they produce control signals related to discrepancies. The speed of reaction of phase comparator 46 in conjunction with its filter 47 is about ten times the speed of reaction of frequency comparator 48 in conjunction with its filter 49.

As explained above there is always input from switch 42 on line 54 and this input has substantially constant frequency but there are many discontinuities where the phase changes suddenly. Just after a discontinuity phase comparator 46 produces an output which causes VCO 51 to change its frequency by a substantial amount. The change of frequency causes the phase gap to get rapidly smaller so that it becomes zero in about ten to fifteen clock periods.

It is emphasized that, during the correction period, the VCO 51 operates at a frequency substantially different from that set by frequency comparator 48 which therefore perceives an error which it tries to correct. Thus the frequency comparator 48 tries to counteract the effect of phase comparator 46 but the slow reaction rate of the frequency comparator 48 prevents this happening. For example, it would take the frequency comparator 48 one hundred clock periods to make a noticeable change in its output signal whereas phase change is almost complete in ten periods. In other words, the phase change is so rapid that it is complete before the frequency control is significantly affected by the discontinuity.

I claim:

1. A node having a transmitter and a receiver for use in a communication system in which a node sends data to a plurality of outstations and receives data from said outstations, which node includes:
   (a) a master clock coupled to said transmitter for controlling the rate of data transmission;
   (b) a receive clock coupled to said receiver for controlling data recovery; and
   (c) synchronization means for synchronizing the receive clock with received signals, said node further including means for feeding the output of the master clock to the synchronization means in the absence of said received signals.

2. A node according to claim 1, in which said receiver includes a squelch circuit and in which the means for feeding the output of the master clock to the synchronization means comprises a two-state switch having a control input connected to said squelch circuit, wherein said two-state switch has an output connected to the synchronization means, a first input connected to receive signals from the receiver and a second input connected to the output of the master clock; wherein the connection to the squelch control circuit serves to control the switch to connect the receiver to the synchronization means when the receiver has a signal and wherein the switch is controlled to connect the output of the master clock to the synchronization means when the receiver has no signal.

3. A node having a transmitter and a receiver for use in a communications system in which a node sends data to a plurality of outstations and receives data from said outstations, which node includes:
   (a) a master clock coupled to said transmitter for controlling the rate of data transmission;
   (b) a receive clock coupled to said receiver for controlling data recovery; and
   (c) synchronization means for synchronizing the receive clock with received signals, said node further including means for feeding the output of the master clock to the synchronization means in the absence of said received signals;

wherein the synchronization means comprises a frequency comparator in parallel with a phase comparator and means for combining the outputs of these two comparators into a single control signal for controlling the receive clock, each of said comparators being connected so as to receive for comparison the signal from the means for feeding and the signal from the receive clock.

4. A node according to claim 3, wherein the response time of the frequency comparator is greater than that of the phase comparator by a factor of 5 to 50.

5. A node according to claim 4, wherein the factor is 5 to 20.

6. A point-to-multipoint data communications system comprising a node having a transmitter and a receiver, a master clock for controlling the rate of data transmission; and a plurality of outstations, each having a receiver and a transmitter and each having a respective clock recovery means for synchronizing the rate of data transmission from the outstation to the node to that of signals received by the outstation from the node, transmission from the outstations to the node taking place on a time-shared basis on a single channel; the node further including: a receive clock for controlling data recovery; synchronization means coupled to said receiver for synchronizing the receive clock with signals received from the outstations; and means for feeding the output of the master clock to the synchronization means in the absence of received signals.

7. A node according to claim 6, wherein the synchronization means comprises a frequency comparator in parallel with a phase comparator and means for combining the outputs of these two comparators into a single control signal for controlling the receive clock, each of said comparators being connected so as to receive for comparison the signal from the means for feeding and the signal from the receive clock.

8. A method for quickly re-establishing node-receive-clock synchronization at the node of a time sharing data communications system, which system includes (a) a master clock at the node controlling data transmissions to plural remotely located outstations, (b) each of which outstations includes an outstation clock synchronized to the master clock via an incoming data stream, said outstation clock controlling data transmissions back to the node, and (c) a node-receive-clock synchronized to a given outstation-clock via an incoming data stream when such an incoming data stream is present, said method comprising the step of:

synchronizing said node-receive-clock to said master clock when said incoming data stream from an outstation is not present.

* * * * *